United States Patent [19]

Otema

[11] Patent Number: 4,560,257

[45] Date of Patent: Dec. 24, 1985

[54] KNOCK-DOWN GEOMETRIC STRUCTURE WITH OPTIONAL MIRRORED FACES

[76] Inventor: Martin Otema, 51 Pine Ridge Dr., Scarborough, Ontario, Canada, M1M 2X6

[21] Appl. No.: 431,529

[22] Filed: Sep. 30, 1982

[51] Int. Cl.$^4$ .......................... G02B 5/08; G02B 7/18;
B65D 85/00; B65D 8/14; B65D 6/00; A47B 95/00; A47B 48/00; A47B 87/00; A47B 67/00; A47F 7/14; A47G 1/16; A47G 1/00; B60R 1/02

[52] U.S. Cl. .................................... 350/616; 350/631; 217/11; 217/12 R; 217/13; 248/345.1; 248/466; 312/108; 312/227; 312/264; 312/265

[58] Field of Search .......... 312/108, 227, 264, 257 R; D6/234; 217/11, 12 R, 13; 248/345.1, 466; 350/612, 616, 631

[56] References Cited

U.S. PATENT DOCUMENTS

| | | | |
|---|---|---|---|
| D. 227,051 | 6/1973 | Snyder | D6/234 X |
| 199,373 | 1/1878 | Kilburn | 217/13 X |
| 655,952 | 8/1900 | Beerling | 312/257 R |
| 3,834,789 | 9/1974 | Brudy | 350/299 X |
| 4,277,141 | 7/1981 | Kleiber | 350/299 |

*Primary Examiner*—John K. Corbin
*Assistant Examiner*—Richard F. Gallivan
*Attorney, Agent, or Firm*—Rogers, Bereskin & Parr

[57] ABSTRACT

Various geometric structures are disclosed. In a preferred embodiment, the structure is a mirror cube formed by five rectangular mirrors defining four sides and a top panel, and an inset base. Upper and lower frames extend around upper and lower margins of the side panels and are coupled together by clamping means. In one embodiment, these clamping means comprise a bolt extending between an inner top panel and the base and releasable from below the base. Other forms of structure are disclosed and may be used as, say, packing cases, furniture structures and the like.

7 Claims, 7 Drawing Figures

KNOCK-DOWN GEOMETRIC STRUCTURE WITH OPTIONAL MIRRORED FACES

This invention relates generally to geometric structures such as so-called "mirror cubes" which are used as display stands in stores. However, the term "geometric structure" as used in this application is to be interpreted broadly as denoting a structure which has the general shape of a hollow prism having upper and lower ends of similar polygonal shape and side faces of rectangular shape extending between the corresponding sides of the respective polygons.

BACKGROUND OF THE INVENTION

A mirror cube as used for displaying goods in a store typically comprises a rigid base in the form of a cube made, for example, of plywood and five rectangular mirror glass panels which are secured by adhesive to the top and side faces of the cube. Typically, an inset "kick panel" is provided around the bottom margin of the cube. This type of mirror cube has several disadvantages. Firstly, the cube is relatively expensive to build. The plywood base must be accurately constructed so that the glass panels fit exactly, which requires the services of a skilled carpenter and the glass panels must then be carefully positioned on the base and secured in place. Secondly, the cube is somewhat inconvenient to transport and store; once assembled, the cube cannot be "knocked down" or collapsed for transportation or storage.

SUMMARY OF THE INVENTION

Broadly considered, an object of the present invention is to provide an improved geometric structure. In one embodiment, the structure may take the form of a mirror cube.

In a broad aspect, the present invention provides a geometric structure having upper and lower ends of similar polygonal shape and side faces of retangular shape extending between the corresponding sides of the respective polygons, wherein the side faces are defined by respective planar rectangular panels disposed in side edge-to-side edge relationship, and wherein the structure further comprises upper and lower frame elements disposed at least at the corners between adjacent said panels at both upper and lower ends of the structure, each said element being adapted to embrace marginal portions of adjacent panels at that corner and being retained on said panels and coupling the panels together.

BRIEF DESCRIPTION OF THE DRAWINGS

In order that the invention may be more clearly understood, reference will now be made to the accompanying drawings which illustrate a number of preferred embodiments of the invention by way of example, and in which.

DETAILED DESCRIPTION OF THE PREFERRED EMBODIMENTS

Figure 1:
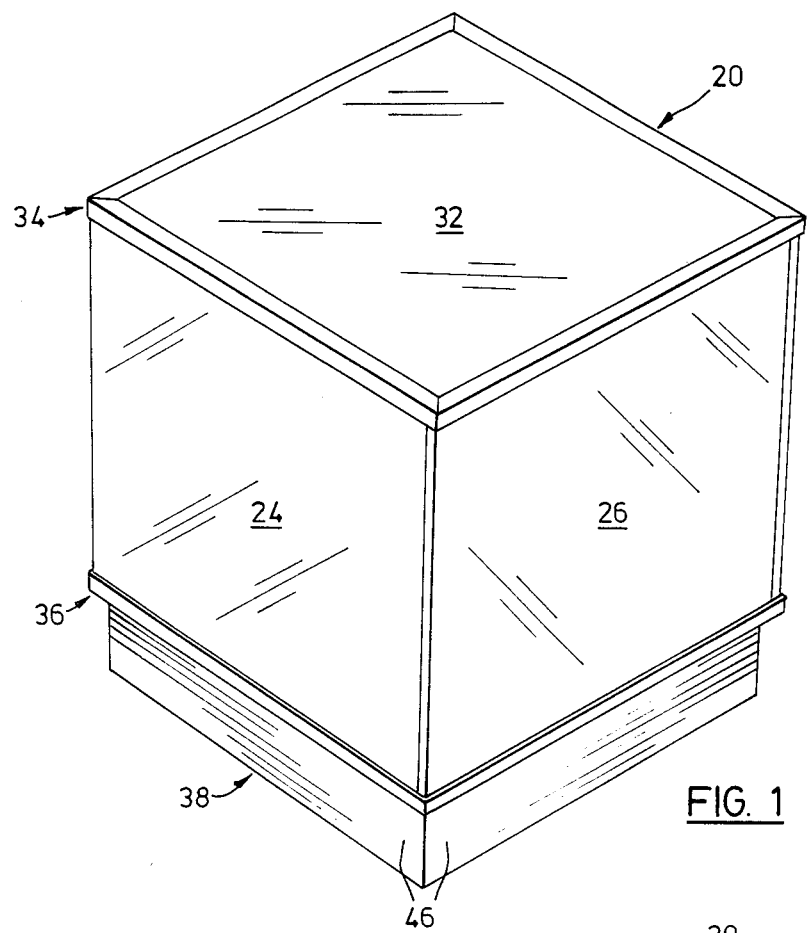
FIG. 1 is a perspective view of a mirror cube in accordance with the invention.

Referring first to FIG. 1, the drawing shows a mirror cube 20 which has the general external appearance of a conventional mirror cube in that it includes an inset kick panel 22 and five mirror glass panels, three of which are visible in FIG. 1. All five panels can be seen in FIG. 2 and it will be seen that four of the panels are disposed substantially at right angles with respect to one another and define four side faces of the cube. These panels are denoted 24, 26, 28 and 30 in FIG. 2. The fifth panel is denoted 32 and defines a top face of the assembled cube.

Upper and lower frames denoted respectively 34 and 36 embrace and are retained on upper and lower marginal portions of the side face panels. These frames hold the panels together as will be described. In addition, the upper frame 34 supports the top panel 32. The lower frame 36 in turn is supported on a base 38.

Figure 3:
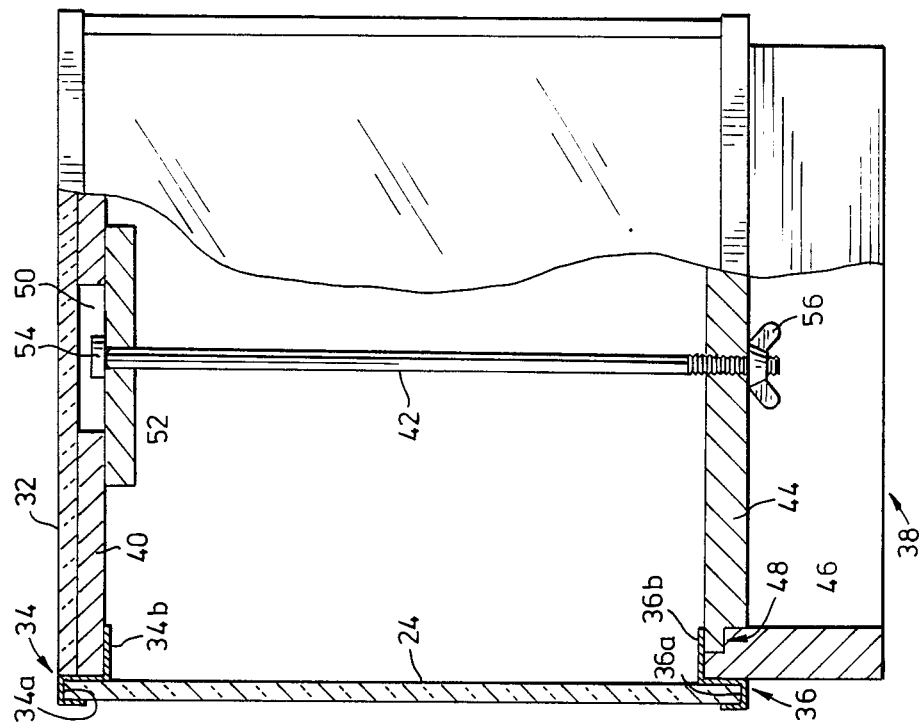
FIG. 3 is a partial vertical sectional view through the assembled cube.

The frames 34 and 36 are essentially the same in that each frame has four limbs, the cross-sectional shape of which can be seen in FIG. 3. However, each frame is in fact continuous in its finished form and may be made from a continuous length of material cut and welded to a rectangular shape and appropriately surface finished. In any event, as can be seen from FIG. 3, the frames define respective channels 34a and 36a which receive the upper and lower margins respectively of the relevant panel (in this case identified as panel 24). The panels also define respective flanges 34b and 36b which extend generally normal to the associated channels. In the assembled cube, these flanges extend horizontally; the flanges 34b of the upper frame 34 support the upper mirror panel 32 by way of an intermediate wooden panel 40, while the horizontal flanges 36b of the lower frame 36 rest on the base 38.

The two frames 34 and 36 are retained on the panels by a bolt 42 which extends between panel 40 and the base 38 and by which these elements are clamped together and in effect clamp the frames onto the side mirror panels.

Base 38 comprises a top panel 44 and four side panels, together denoted 46, which form a frame around the top panel. Panels 44 and 46 are made of wood and are glued together to form a rigid base. The corners of the frame are mitred and formed with an internal peripheral rebate which mates with a corresponding external peripheral rebate on panel 44 as generally indicated at 48 in FIG. 3. The panels are glued and nailed or stapled together.

Panel 40 at the top of the cube is also a wooden panel. A central opening 50 is formed in panel 40 and is covered by a further wooden panel 52 which is secured to the underside of panel 40 and through which bolt 42 extends. The bolt has a head 54 at its upper end and is screw-threaded at its lower end where it passes through a central opening in the top panel 44 of base 38. A nut 56 at the lower end of the rod is used to clamp panel 40 and base 38 together as described above. In this way, the components of the cube are effectively clamped together to form a single unit but at the same time the cube can be readily knocked down simply by inverting the cube and releasing bolt 56. Glass panel 32 simply rests on the top wooden panel 40 although it could be secured in place by adhesive if this were considered necessary. In an alternative embodiment, the glass panel 32 could of course be replaced by some other form of panel, for example, an upholstered panel.

The frames 34 and 36 and the base 38 will be finished in suitably decorative fashion. For example, the frames may be chrome-plated and the base appropriately painted.

Figure 2A:
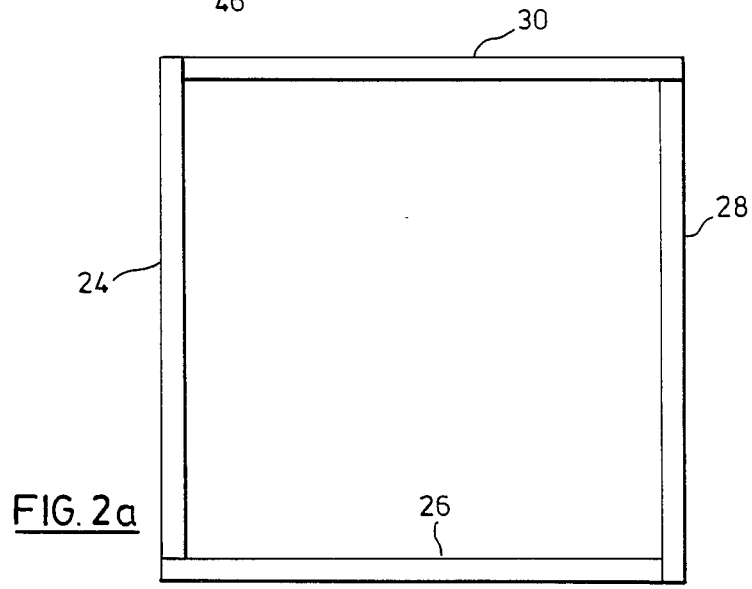
FIG. 2a is a diagrammatic illustration showing the configuration of the mirror glass panels of the cube.
Figure 2:
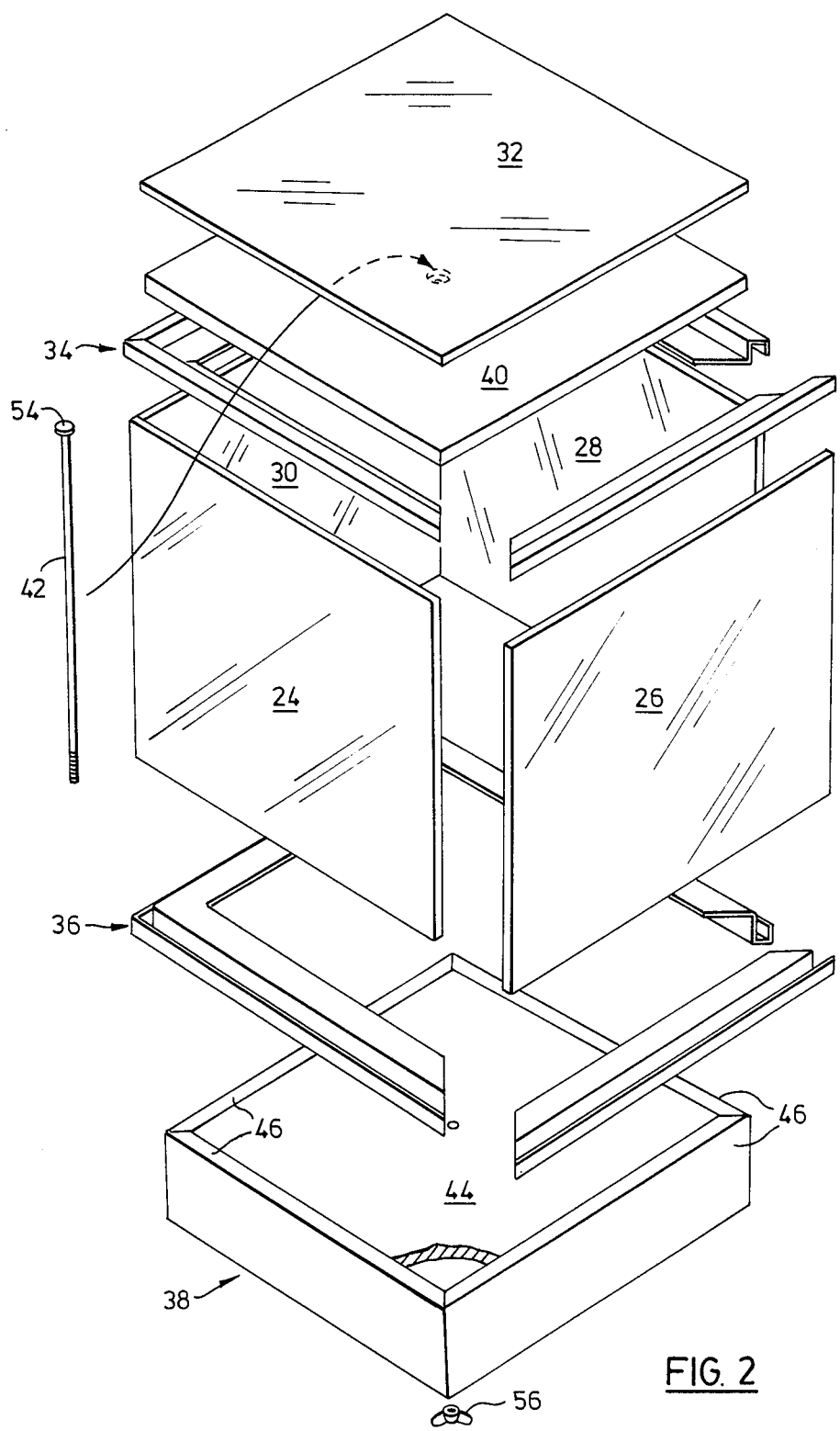
FIG. 2 is an exploded perspective of the mirror cube shown in FIG. 1.

FIG. 2a illustrates diagrammatically the arrangement of the mirror panels 24, 25, 28 and 30 at the sides of the cube and it will be seen that the panels are arranged so that one end edge of each panel butts against a marginal portion of the inner side face of the adjacent panel; in this way the adjacent panel effectively tively braces the other panel. Opposite (parallel) panels are braced against movement in opposite directions which means that the panel arrangement tends to resist "lozenging" of the cube as a whole. For example, as drawn in FIG. 2a, panel 24 is braced against movement upwards in the drawing while panel 28 is braced against movement downwards; panel 30 is braced against movement to the right and panel 26 against movement to the left. Thus, it has been found that this configuration of panels provides for an extremely rigid cube structure.

Figure 4:
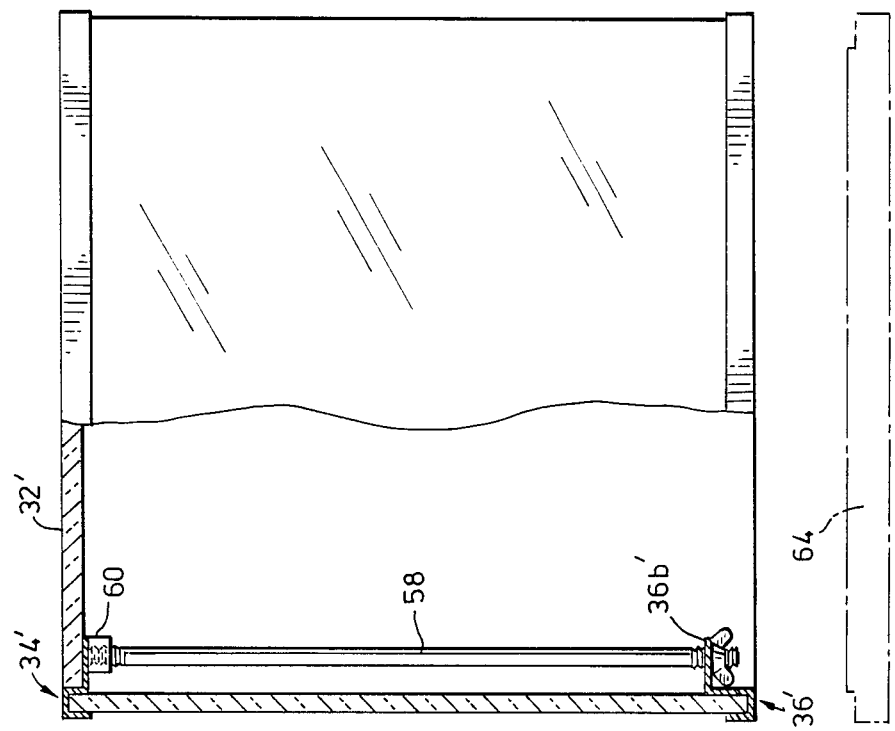
FIG. 4 is a view similar to FIG. 3 illustrating a modified form of cube.

FIG. 4 illustrates a further embodiment of the invention in which primed reference numerals have been used to denote parts corresponding with parts shown in FIG. 3. In this case, the central bolt 42 has been replaced by a bolt 58 which extends directly between the two frames 34' and 36'. A second similar bolt would normally be provided at the opposite side of the cube to provide for symmetry of clamping; however, for clarity of illustration, this second bolt has not been shown. Bolt 58 is screw-threaded at both ends and at its upper end is threaded into an internally screw-threaded collar 60 on the upper frame 34'. At its lower end, the bolt extends through an appropriate opening in the horizontal flange 36b' of frame 36' and is fitted with a wing nut 62. In contrast to the preceding embodiment, the top glass panel 32' rests directly on the frame and the cross-sectional shape of the frame is suitably changed to correspond with the thickness of the panel. The lower frame 36' could also be similarly shaped if required.

The embodiment shown in FIG. 4 is particularly appropriate for a cube in which no base is required. An example of a suitable base is shown in ghost outline at 64 in FIG. 4 but can be omitted. Of course, the top panel 32' could also be omitted if required; for example, if the cube were to be used as an opened-ended display structure.

The construction shown in FIG. 4 may also be useful in cube structures for other purposes. For example, the side panels of the cube could be made of wood and suitable end panels fitted to the frames 34' and 36' by suitable fastening means such as external binding straps or the like. In this case, the cube structure might well be used as, say, a storage or packing crate.

Figure 5:
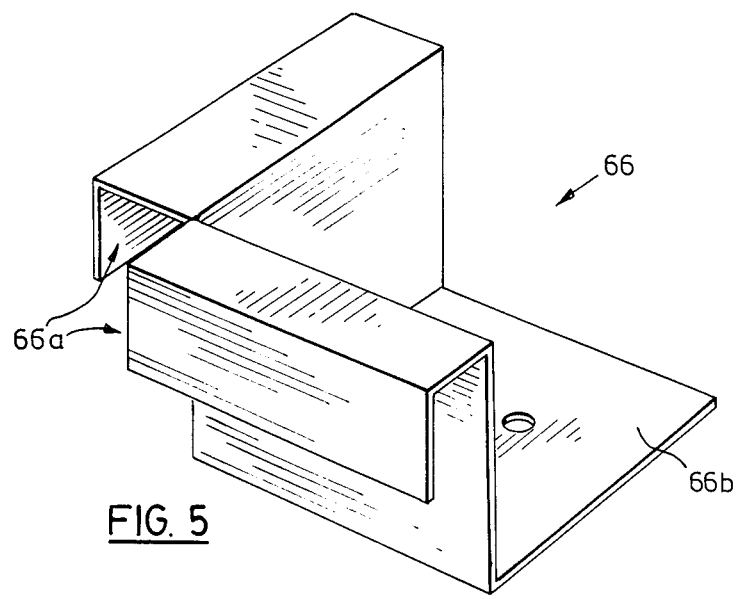
FIG. 5 is a perspective view of a frame element in accordance with a further embodiment of the invention; and, FIG. 6 is a view similar to FIGS. 3 and 4 showing a cube constructed using the frame elements of FIG. 5.
Figure 6:
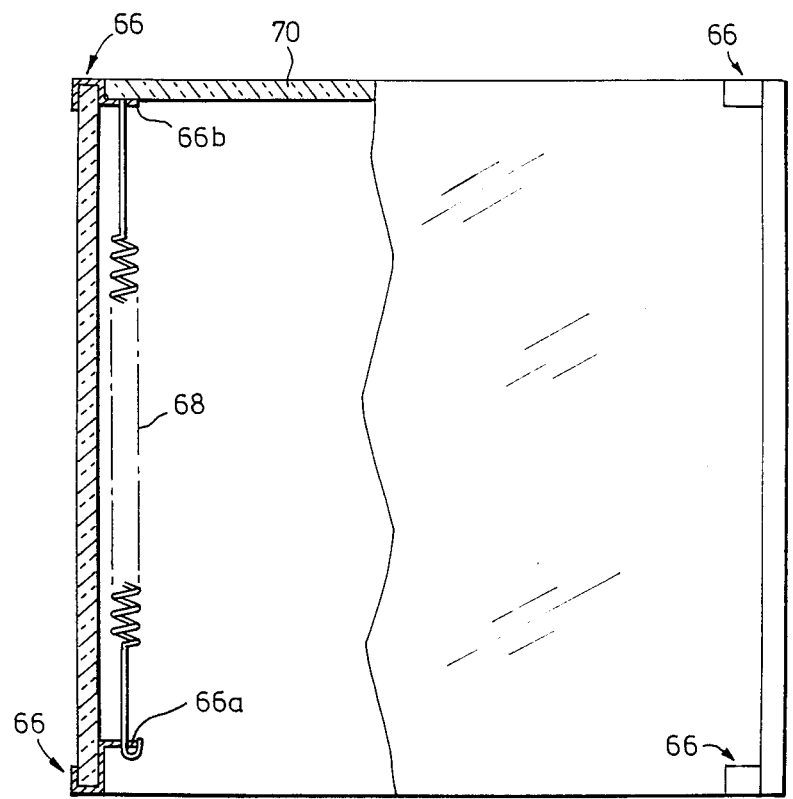

FIGS. 5 and 6 illustrate a further embodiment of the invention in which the continuous upper and lower frames 34 and 36 are replaced by corner frame elements, one of which is shown in FIG. 5 and is generally denoted 66. In this case, frame elements such as element 66 would be used at the upper and lower ends of all four corners of the cube. Edges of the glass panels between the corners can be suitably decoratively finished (e.g. bevelled) for neatness of appearance. Frame element 66 defines two mutually perpendicular channel portions 66a which embrace the upper margins of the respective panels at the corner of the structure, and a flange portion 66b similar to the horizontal flange 34b and 36b of the frames.

In FIG. 6, two of the clips 66 are shown at one corner of the frame and in this case, the flange portion 66b of the respective frame elements are connected by a tension spring 68 which holds the clips on the side panels. A top panel 70 is shown supported by the clips 66 at the top of the cube and a base may be provided at the lower margins of the panels, generally as described in the preceding embodiments.

It is of course to be understood that the various forms of retaining means such as the spring 68 and the bolts 42 and 58 are interchangeable between the various embodiments and that other forms of retaining means may also be used. For example, it would be possible to employ cables, straps or other elongate elements, for example, fitted with a turn buckle or other suitable tension means. In other embodiments, the frames or frame elements could be designed to be frictionally fitted on to the panels.

It will be understood from the foregoing that the preceding description relates to particular preferred embodiments of the invention and that many modifications are possible within the broad scope of the claims. Some of those modifications have been indicated and other modifications such as changes in material, dimensions and proportions will be readily apparent to a person skilled in the art. For example, while the panels of the structure will often be glass or mirror panels, panels of other materials may be used. In some cases, wooden panels (which may be painted or covered with plastic laminates) may be appropriate.

As indicated previously, the invention is applicable to geometric structures of many different forms ranging from structures (e.g. mirror cubes) for use as store displays to packing or storage containers, furniture units and the like. In many cases the structure will be cuboid in shape but other prismatic shapes are possible. For example, structures of hexagonal shape in plan may be particularly suitable as store displays, although octogonal or other multi-sided shapes are possible. In these cases complete frames of appropriate shapes are preferred at the upper and lower ends of the structure (as opposed to corner clips only). Also, the side edges of the panels should be braced against one another generally in similar fashion to the arrangement shown in FIG. 2. In a minimum case, the structure might be of triangular shape in plan.

I claim:

1. A mirror cube having upper and lower ends and four rectangular side faces disposed substantially at right angles with respect to one another, the structure comprising four rectangular mirror panels respectively defining said side faces, upper and lower frame elements extending respectively around upper and lower marginal portions of said mirror panels and embracing and being retained on said marginal portion of the panels, said frames being decoratively finished, a top mirror panel supported by said top frame substantially even with said frame, and a base co-operating with said frame at the lower end of the structure and supporting said mirror panels.

2. A geometric structure having upper and lower ends of similar polygonal shape and side faces of rectangular shape extending between the corresponding sides of the respective polygons; the structure comprising:

said side faces being defined by respective planar rectangular mirror glass side panesl disposed in side edge-to-side edge relationship; upper and lower frame elements disposed at least at the corners between adjacent said panels at both upper and lower ends of the structure, each said frame element defining a channel which embraces the marginal portion of the relevant side panel, and a laterally directed flange which extends generally normal to the plane of the panel and which is inset from the relevant side panel edge, whereby the flanges of the frame elements at the upper end of the structure co-operate to define surfaces for supporting a top panel and the flanges of the frame elements at the lower end of the structure co-operate to define surfaces capable of being supported on a base of the structure; and clamping means co-operating with the flanges of the frame elements at the upper and lower ends of the structure and adapted to urge the elements towards one another to effectively clamp the elements onto the panels.

3. A structure as claimed in claim 2, wherein said upper and lower frame elements form part of respective upper and lower frames which extend completely around margins of all of said panels at said upper said lower ends of the structure respectively.

4. A geometric structure having upper and lower ends of similar polygonal shape and side faces of rectangular shape extending between the corresponding sides of the respective polygons, the structure comprising: said side faces being defined by respective planar rectangular side panels disposed in side edge-to-side edge relationship; upper and lower frame elements disposed at least at the corners between adjacent said panels at both upper and lower ends of the structure, each said frame element defining a channel which embraces the marginal portion of the relevant side panel, and a laterally directed flange which extends generally normal to the plane of the panel and which is inset from the relevant side panel edge, whereby the flanges of the frame elements at the upper end of the structure co-operate to define surfaces for supporting a top panel and the flanges of the frame elements at the lower end of the structure co-operate to define surfaces capable of being supported on a base of the structure; clamping means co-operating with the flanges of the frame elements at the upper and lower ends of the structure and adapted to urge the elements towards one another to effectively clamp the elements onto the panels; an inner top panel supported on said flanges of the frame elements at the upper end of the structure; and a base on which the flanges of said elements at the lower end of the structure are supported, said inner top panel supporting said top panel of the structure, and wherein said clamping means extend between said inner top panel and said base.

5. A structure as claimed in claim 4, wherein said clamping means comprises a bolt and nut combination, said bolt extending between said inner top panel and said base, and said nut being accessible from below the base whereby the clamping means can be released to permit the structure to be knocked down.

6. A structure as claimed in claim 4, wherein said clamping means comprise at least two bolt and nut combinations extending between the flanges of the upper and lower frame elements and adapted to draw the elements towards one another, the elements being spaced around the structure so that a substantially symmetrical clamping force is applied to the panels when the bolts are tightened.

7. A structure as claimed in claim 4, wherein said base comprises four rectangular side panels corresponding to said rectangular panels of the structure and inset inwardly from the respective structure panels, and a top panel coupled to said side panels and to which said clamping means is coupled.

* * * * *